L. BROOKS.
Saw Set.

No. 15,119.

Patented June 17, 1856.

UNITED STATES PATENT OFFICE.

LEBBEUS BROOKS, OF GREAT FALLS, NEW HAMPSHIRE.

SAW-SET.

Specification of Letters Patent No. 15,119, dated June 17, 1856.

*To all whom it may concern:*

Be it known that I, LEBBEUS BROOKS, of Great Falls, in the county of Strafford and State of New Hampshire, have invented an Improved Nipper Saw-Set; and I do hereby declare that the same is fully described and represented in the following specification and the accompanying drawings, of which—

Figure 1:
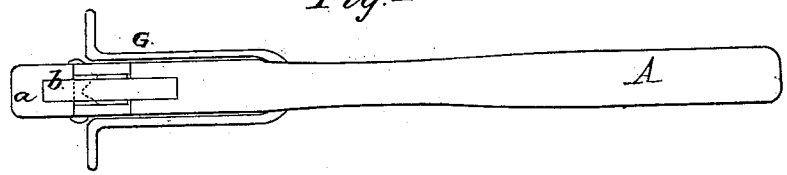
Figure 2:
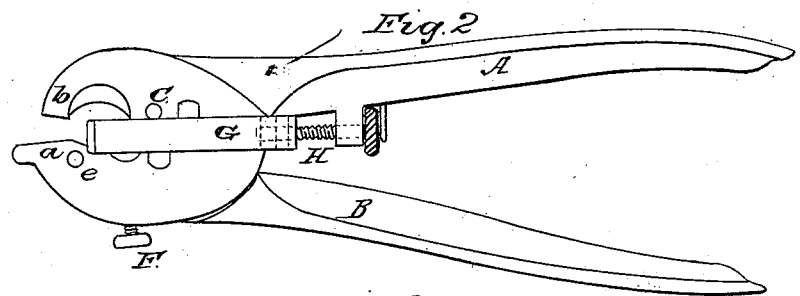
Figure 3:
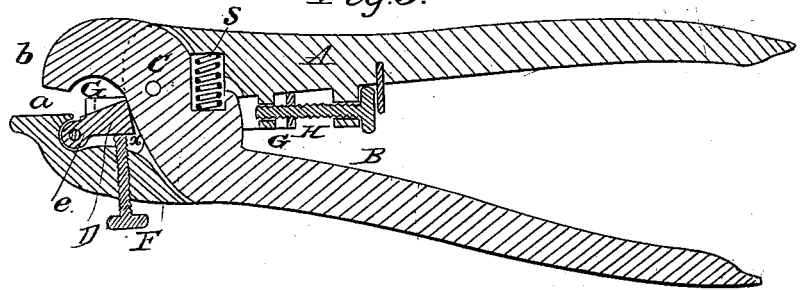
Figure 4:
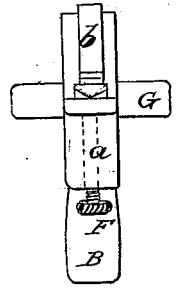
Figure 5:
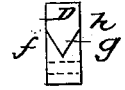

Figure 1, is a top view of the same; Fig. 2, a side elevation of it; Fig. 3, a vertical, central, and longitudinal section of it; Fig. 4, a front end view of it; Fig. 5, a top view of its movable and adjustable angular bed.

In these drawings, A, and B, exhibit a pair of nippers, which are applied to each other in the manner as shown in the drawings, and made to turn on a common fulcrum or pin C, arranged as shown in Fig. 3. The jaws of said nippers or nipper levers are represented in Figs. 1, 2, and 3, at $a$, and $b$. Within the inferior arm, $c$, of the lever, A, or in a suitable recess, $x$, made therein, there is arranged a block or adjustable bed D, which turns upon a fulcrum or pin, $e$, disposed as seen in Figs. 2, and 3, and is supplied with an adjusting screw F, by which its upper face or surface may be elevated into an obtuse angle with the plane of the lower jaw and such angle varied as occasion may require. The upper surface of said adjustable bed is formed angular, as seen at $f$, $g$, $h$, in Fig. 5, and has the vertex of the angle arranged next to the inner edge of the jaw, $a$. A sliding gage G, regulated by an adjusting screw, H, is applied to the lever, A, as seen in the drawings. It embraces the said lever and by the movable bed, and its adjusting screw it may be caused either to approach toward or recede from the jaw, $a$.

When the instrument is used the front edge of the adjustable gage should be at a distance from the jaw equal to the length of a tooth of the saw to be operated on. By making the upper surface of the adjustable bed angular as described and arranging it with respect to the jaws, $a$, $b$, and the adjustable gage as specified, we have the means of readily adapting said bed to operate on a saw tooth of any ordinary length or width, as the bed may always be brought between the two next adjacent teeth, between which said tooth may be situated. When the bed has been elevated so that the top surface shall stand at the required angle to the bearing face of the jaw, $a$, we have only to adjust the gage, G, a distance from the jaw, equal to the depth of the saw tooth and the instrument will be ready for use. The parts of it being so arranged a saw may be introduced between the jaws and so that its teeth may abut against the front ends of the gage G, while the tooth to be bent up is placed directly upon the top surface of the movable bed. By firmly closing the jaws together upon the saw, the tooth will be set to the angle required.

The manner of constructing the movable bed and applying or arranging it with regard to the jaws and gage, renders the nipper saw set universal in its application, or in other words, capable of being used for the bending or setting of saw teeth of different sizes, or those of either large or small saws. For opening the jaws asunder the instrument is furnished with a spiral spring S, arranged within it as seen in Fig. 3.

What I claim as my invention or improvement, is—

Arranging the adjustable angular bed in the jaw lever and with respect to the jaws and sliding gage applied thereto substantially as hereinbefore explained.

In testimony whereof, I have hereunto set my signature this twenty-sixth day of January, A. D. 1856

LEBBEUS BROOKS.

Witnesses:
 R. H. EDDY,
 F. P. HALE, Jr.